(12) United States Patent
Badura et al.

(10) Patent No.: US 9,316,804 B2
(45) Date of Patent: Apr. 19, 2016

(54) CABLE CLOSURE

(71) Applicant: CCS Technology, Inc., Wilmintgon, DE (US)

(72) Inventors: Stefan Badura, Menden (DE); Mike Breuer-Heckel, Dortmund (DE); Lars Kittler, Schwerte (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 14/539,346

(22) Filed: Nov. 12, 2014

(65) Prior Publication Data

US 2015/0071598 A1 Mar. 12, 2015

Related U.S. Application Data

(63) Continuation of application No. PCT/US2013/041522, filed on May 17, 2013.

(30) Foreign Application Priority Data

May 18, 2012 (EP) .................................... 12168508

(51) Int. Cl.
| | |
|---|---|
| *G02B 6/00* | (2006.01) |
| *G02B 6/44* | (2006.01) |
| *H02G 15/013* | (2006.01) |
| *H02G 15/113* | (2006.01) |

(52) U.S. Cl.
CPC .............. *G02B 6/4494* (2013.01); *G02B 6/445* (2013.01); *H02G 15/013* (2013.01); *H02G 15/113* (2013.01); *G02B 6/4444* (2013.01)

(58) Field of Classification Search
CPC .... G02B 6/4471; G02B 6/3897; G02B 15/10; G02B 6/4444; G02B 7/00
USPC .................. 385/33, 40, 52, 135; 174/50.5
See application file for complete search history.

(56) References Cited

U.S. PATENT DOCUMENTS

| 6,269,214 B1 | 7/2001 | Naudin et al. ................. 385/135 |
|---|---|---|
| 6,344,615 B1 | 2/2002 | Nolf et al. |

(Continued)

FOREIGN PATENT DOCUMENTS

| EP | 0978746 A1 | 2/2000 |
|---|---|---|
| FR | 2749713 | 12/1997 |

(Continued)

OTHER PUBLICATIONS

Patent Cooperation Treaty International Search Report, Application No. PCT/US2013/041522, Feb. 3, 2014, 4 pages.

*Primary Examiner* — Ellen Kim
(74) *Attorney, Agent, or Firm* — Robert L. Branham (57) ABSTRACT

A cable closure includes a housing that delimits an interior of the cable closure and seals off the cable closure toward the outside. The housing is formed by a covering body having shells hinged together and cable insertion regions provided on mutually opposite sides of the shells. Sealing elements are positioned at the mutually opposite sides of the covering body proximate the cable insertion regions. A closing mechanism having a latch and latch support is configured to lock the shells together. The latch support has a first end section pivotably attached to one of the shells and a second end section pivotably attached to the locking latch, which in turn has an end section serving as an actuating handle for closing and opening the cable closure.

17 Claims, 5 Drawing Sheets

(56) References Cited

U.S. PATENT DOCUMENTS

| | | |
|---|---|---|
| 6,802,512 B2 | 10/2004 | Muller et al. |
| 7,130,519 B2 * | 10/2006 | Grubish et al. ............... 385/135 |
| 7,376,325 B1 * | 5/2008 | Cloud et al. .................. 385/135 |
| 7,799,995 B2 | 9/2010 | Mullaney et al. |
| 2003/0026647 A1 | 2/2003 | Sasaki et al. .................. 403/288 |
| 2003/0081396 A1 * | 5/2003 | Smith ........................... 361/801 |
| 2006/0204198 A1 * | 9/2006 | Michiels ....................... 385/135 |

FOREIGN PATENT DOCUMENTS

| | | |
|---|---|---|
| WO | 2007118548 A1 | 10/2007 |
| WO | WO2008/051671 A1 | 5/2008 |

* cited by examiner

CABLE CLOSURE

CROSS-REFERENCE TO RELATED APPLICATIONS

This application is a continuation of International Application No. PCT/US13/41522, filed on May 17, 2013, which claims the benefit of priority to European Application No. 12168508.5, filed on May 18, 2012, both applications being incorporated herein by reference.

BACKGROUND

The disclosure relates generally to cable closures and more particularly to cable closures which may be used for telecommunication cables.

Cable closures are used in telecommunications cable networks for protecting spliced joints at connection points between two telecommunications cables and for protecting branch points or splitting points of telecommunications cables. In this case, the cable closures need to ensure the continuity of the telecommunications cables as though the telecommunications cables had not been interrupted.

The product catalog "Accessories for Fiber Optic Networks", Edition 1, page 75, Corning Cable Systems, 2001 discloses cable closures firstly in the form of in-line cable closures and secondly in the form of dome cable closures, which all have a housing which defines an interior of the cable closure and seals off the interior thereof from the outside. Conventionally, assemblies for connecting, namely for splicing, telecommunications conductors guided in telecommunications cables are arranged in the interior defined by the housing of the cable closure.

In the case of cable closures in the form of dome cable closures, the housing is formed by a dome-like covering body and a sealing body, the sealing body defining cable insertion regions, which are sealed off on one side of the dome-like covering body and via which all of the cables can be inserted into the interior of the cable closure.

In the case of cable closures in the form of inline cable closures, cable insertion regions which are sealed off on two opposite sides of the covering body are formed for inserting cables into the interior of the cable closure, with the result that inline cable closures can be installed in one line with the cables.

DE 20 2010 006 582 U1 discloses an inline cable closure, having a housing, which delimits an interior of the cable closure and seals off the cable closure toward the outside, the housing comprising a covering body, the covering body comprises shells and provides on mutually opposite sides of the same cable insertion regions for inserting cables into the interior of the cable closure and/or for passing cables out of the interior of the cable closure. Compressible and/or deformable sealing elements are positioned at the mutually opposite sides of the covering body in the region of the cable insertion regions of the shells, wherein each of the sealing elements is positioned between barrier walls of the respective shell, namely between a barrier wall facing the interior of the cable closure and a barrier wall remote from the interior of the cable closure.

According to DE 20 2010 006 582 U1 the inline cable closure comprises a closing mechanism by which the shells can be locked together in a closed status of the cable closure, whereby the closing mechanism comprises clip-like fastening elements and fastening screws extending through the two shells.

WO 2008/051671 A1 discloses another example of an inline cable closure.

SUMMARY

The closing mechanism of the novel cable closure comprises at least one locking segment having a locking latch and a latch support, wherein the latch support is with a first end section pivotably attached to a first one of the shells, and wherein the latch support is with a second end section pivotably attached to the locking latch, wherein the locking latch has a first end section acting together with a second one of the shells when closing and opening the cable closure, and wherein the locking latch has a second end section serving as an actuating handle for closing and opening the cable closure.

The closing mechanism of the novel cable closure works easy under various conditions and allows an opening and closing of the closure by hand without the need of an extra tool. The closing mechanism ensures an easy reopening when access is needed to the interior of the closure e.g. when splice work has to be performed. In addition to the easy handling, the closing mechanism of the novel cable closure locks the closure safely and permanently.

According to some embodiments, the cable closure includes a housing that delimits an interior of the cable closure and seals off the cable closure toward the outside. The housing is formed by a covering body that comprises shells and cable insertion regions provided on mutually opposite sides of the shells for inserting cables into the interior of the cable closure and/or for passing cables out of the interior of the cable closure. Compressible and/or deformable sealing elements are positioned at the mutually opposite sides of the covering body in the region of the cable insertion regions of the shells. The latch support of the closing mechanism includes an elongate body extending in a longitudinal direction and a plurality of support ribs projecting from the elongate body in a transverse direction. The number of support ribs per unit length of the latch support in the longitudinal direction is greater in a section of the latch support that is aligned in a transverse direction with the compressible and/or deformable sealing elements.

The closing mechanism may have an increased length in a longitudinal direction of the cable closure to further facilitate actuation and handling. The increased length may be expressed as a ratio comparing the longitudinal length to a transverse length. For example, the distance between free ends of the first and second end sections of the locking latch may define a transverse length of the locking latch. The locking latch extends in a longitudinal direction so as to have a longitudinal length that is at least twice the transverse length of the locking latch. Such a configuration may reduce or minimize the overall number of latches a user must actuate to close the cable closure. The increased longitudinal length of the locking latch also provides a large gripping area that allows users to actuate and/or grip the locking latch with multiple or all fingers.

The force needed to close the closing mechanism depends on the number and size of cables handles in the cable insertion regions. The closing mechanism offers two lock-in positions which decreases the closing forces needed during operation with the cable closure.

The latch support may be with the second end section pivotably attached to a section of the locking latch having a shorter distance to the first end section of the locking latch than to the second end section of the same. This allows to further decrease the closing forces needed during operation with the closure.

The first end section of the locking latch may comprise a recess and a protrusion, wherein the protrusion provides a free end of the locking latch, wherein the recess is positioned between the protrusion and the section of the locking latch to which the second end section of the latch support is pivotably attached.

In a first lock-in position of the respective locking segment of the closing mechanism a protrusion of the second one of the shells projects into the recess of first end section of the locking latch thereby fixing the relative position of the shells in a partially closed position of the same. In a second lock-in position of the respective locking segment of the closing mechanism the protrusion of the first end section of the locking latch projects into a recess of the second one of the shells thereby fixing the relative position of the shells in a fully closed position of the same. The respective locking segment is transferable/movable between the first lock-in position and the second lock-in position and vice versa between the second lock-in position and the first lock-in position by applying a force to the second end section of the locking latch and by pivoting to the second end section of the locking latch. Such a design is simple and reliable. The locking latch of the locking segment may pivot at least 90 degrees between the first and second lock-in positions.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

The present disclosure relates to a cable closure 10, which in the exemplary embodiment shown is an inline cable closure comprises a housing which is formed by a covering body 13 composed of two shells 11 and 12.

In the exemplary embodiment shown, the shells 11 and 12 are half-shells and the half-shell 11 is a so-called lower shell and the half-shell 12 is a so-called upper shell of the covering body 13, which together define an interior 14 of the inline cable closure 10.

Cable insertion regions 17 are formed on mutually opposite sides 15 of the in-line cable closure 10 or the covering body 13, with it being possible for cables to be inserted into the interior 14 of the inline cable closure 10 or passed out of the interior. In the exemplary embodiment shown, in each case two cable insertion regions 17 for inserting in each case one cable into the interior 14 of the inline cable closure 10 are formed on both mutually opposite sides 15 of the covering body 13.

In the shown embodiment, the two half-shells 11 and 12 are hinged together at first sides 18, 19 of the same. In the example embodiment the first sides 18, 19 are longitudinal sides of the shells 11, 12. The half-shells 11 and 12 can be pivoted with respect to each other around a hinge 20 by which the two half-shells 11 and 12 are fixed to each other at the first longitudinal sides 18, 19 of the same.

When the inline cable closure 10 is closed, second sides 21, 22 of the two half-shells 11 and 12 can be locked to each other by a closing mechanism 23. In the example embodiment the second sides 21, 22 are other longitudinal sides of the shells. The closing mechanism 23 will be described below in greater detail.

In order to ensure that the cables to be inserted into the interior 14 of the inline cable closure 10 via the cable insertion regions 17 are sealed off, compressible and/or deformable sealing elements 16, which are each arranged between barrier walls (not shown), are positioned in the region of both mutually opposite sides 15 of the covering body 13 of the inline cable closure 10 on which the cable insertion regions 17 are formed, both in the region of the lower half-shell 11 and in the region of the upper half-shell 12.

The compressible and/or deformable sealing elements 16 may be gel-like sealing elements, for example polyurethane gels or silicone gels. Such gel-like sealing elements are deformable and can be compressible.

As mentioned above, the half-shells 11, 12 of the covering body 13 are hinged together at the first longitudinal sides 18, 19 so that the two half-shells 11, 12 can be pivoted relative to each other around an axis or hinge 20 running parallel to the longitudinal sides 18, 19 when opening and closing the cable closure 10.

The closing mechanism 23 can be used to lock the half-shells 11, 12 of the covering body 13 to each other at second longitudinal sides 21, 22 of the same when the half-shells 11, 12 of the covering body 13 are in the closed position.

The closing mechanism 23 comprises at least one locking segment 24 having a locking latch 25 and a latch support 26. In one embodiment, the closing mechanism 23 comprises at least two locking segments 24 being positioned side by side and being individually lockable and unlockable.

The latch support 26 of the respective locking segment 24 is with a first end section 27 pivotably attached to a first one of the shells, namely in the shown embodiment to the so-called lower half-shell 11. Further on, the latch support 26 is with a second end section 28 pivotably attached to the locking latch 25. In the shown embodiment, the latch support 26 has a curved cross-section, for example a C-shaped or U-shaped cross-section, whereby the end sections 27, 28 of the same are provided by legs of the C-shaped or U-shaped latch support 26.

The locking latch 25 of the respective locking segment 24 has a first end section 29 acting together with a second one of the shells, namely in the shown embodiment to the so-called upper half-shell 12, when closing and opening the cable closure 10. The first end section 29 of the locking latch 25 may, for example, pivot about a portion of the second shell 12. Further on, the locking latch 25 has a second end section 30 serving as an actuating handle for closing and opening the cable closure 10.

The latch support 26 of the respective locking segment 24 is with the second end section 28 pivotably attached to a section of the locking latch 25 having a shorter distance to the first end section 29 of the locking latch 25 than to the second end section 30 of the same. In the shown embodiment, the section of the locking latch 25 to which the second end section 28 of the latch support 26 is pivotably attached, is positioned immediately adjacent to the first end section 29 of the locking latch 25.

The first end section 29 of the locking latch 25, which acts together with a second one of the shells 12 when closing and opening the cable closure 10, comprises a recess 31 and a protrusion 32. The protrusion 32 provides a free end of the locking latch 25. The recess 31 is positioned between the protrusion 32 and the section of the of the locking latch 25 to which the second end section 28 of the latch support 26 is pivotably attached.

Figure 1:
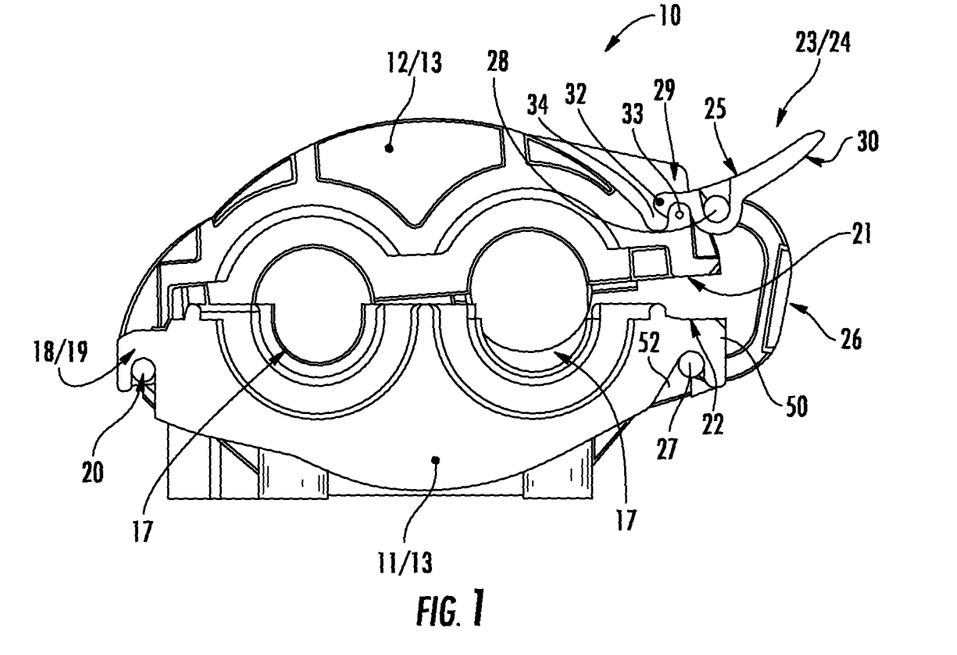
FIG. 1 is a side view of an exemplary embodiment of a cable closure in form of an inline cable closure in a partially closed status of the same.
Figure 2:
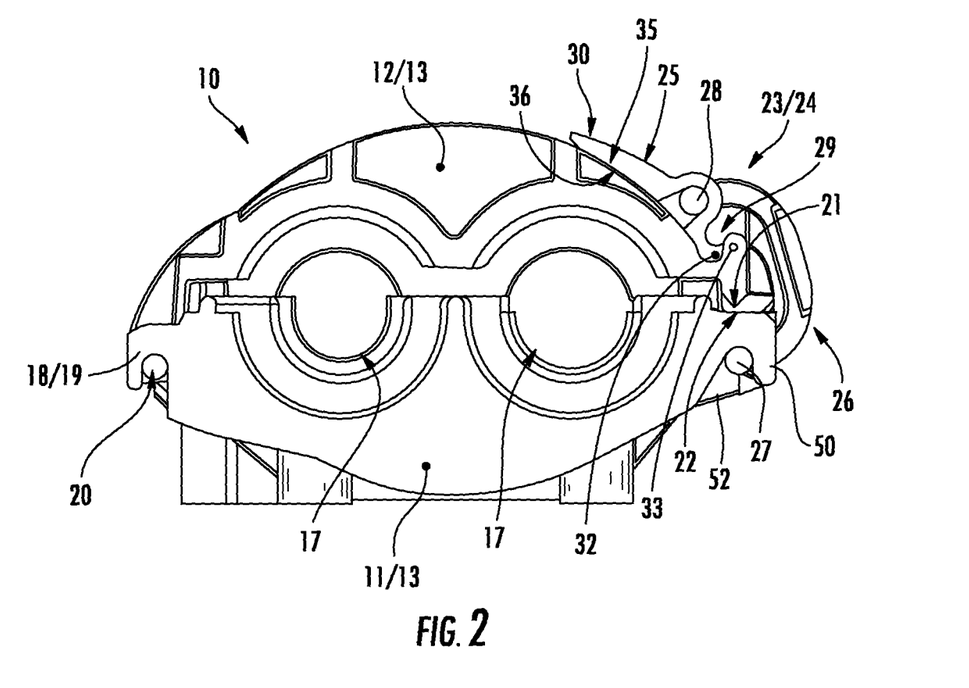
FIG. 2 is a side view of the exemplary embodiment of the cable closure in a completely closed status of the same.

In a first lock-in position of the respective locking segment 24 of the closing mechanism 23 (see FIGS. 1, 3 and 9) a protrusion 33 of the second one of the shells 12 projects into the recess 31 of first end section 29 of the locking latch 25 thereby fixing the relative position of the shells 11, 12 in a partially closed position of the same. In that in a second lock-in position of the respective locking segment 24 of the closing mechanism 23 (see FIGS. 2 and 4) the protrusion 32 of the first end section 29 of the locking latch 25 projects into a recess 34 of the second one of the shells 12 thereby fixing the relative position of the shells 11, 12 in a fully closed position of the same.

The respective locking segment 24 of the closing mechanism 23 is transferable/movable between the first lock-in position (see FIGS. 1, 3 and 9) and the second lock-in position (see FIGS. 2 and 4) and vice-versa between the second lock-in position and the first lock-in position by applying a force to the second end section 30 of the locking latch 25 and by pivoting the second end section 30 of the locking latch 25. The overall configuration of the locking segment 24 and the second one of the shells 12 is such that the locking latch 25 pivots/rotates at least 90 degrees between the first lock-in position and second lock-in position. The manner in which the pivotal movement occurs in the embodiment shown will now be described in further detail.

For transferring the respective locking segment 24 of the closing mechanism 23 from the first lock-in position (see FIGS. 1, 3 and 9) into the second lock-in position (see FIGS. 2 and 4) the locking latch 25 is pivotable around an axis defined by the protrusion 33 of the second one of the shells 12 and the recess 31 of first end section 29 of the locking latch 25.

During this transfer of the locking segment 24 from the first lock-in position (see FIGS. 1, 3 and 9) into the second lock-in position (see FIGS. 2 and 4) the protrusion 32 of the first end section 29 of the locking latch 25 becomes engaged with the recess 34 of the second one of the shells 12 while the protrusion 33 of the second one of the shells 12 becomes disengaged with the recess 31 of first end section 29 of the locking latch 25.

For transferring the respective locking segment 24 of the closing mechanism 23 from the second lock-in position (see FIGS. 2 and 4) into the first lock-in position (see FIGS. 1, 3 and 9) the locking latch 25 is pivotable around an axis defined by the protrusion 32 of the first end section 29 of the locking latch 25 and the recess 34 of the second one of the shells 12.

During this transfer of the locking segment 24 from the second lock-in position (see FIGS. 2 and 4) into the first lock-in position (see FIGS. 1, 3 and 9) the protrusion 33 of the second one of the shells 12 becomes engaged with the recess 31 of first end section 29 of the locking latch 25 while the protrusion 32 of the first end section 29 of the locking latch 25 becomes disengaged with the recess 34 of the second one of the shells 12.

In the second lock-in position of the respective locking segment 25 of the closing mechanism 23 (see FIGS. 2 and 4) a surface 35 of the second end section 30 of locking latch 25 contacts a surface 36 of the second one of the shells 12.

In the first lock-in position of the respective locking segment 25 of the closing mechanism 23 the partially opened or partially closed shells 11, 12 are held together in their relative position by the closing mechanism 23 when a cable is inserted in at least one of the cable insertion regions 17. The closing mechanism 23, namely the respective locking latch 25 of the respective locking segment 24, prevents in the first lock-in position a further opening of the shells 11, 12 especially when a cable is inserted in at least one of the cable insertion regions 17. When a cable becomes inserted into a cable insertion region 17 and when the shells 11, 12 are transferred into their partially opened or partially closed status defined by first lock-in position, the cable acts on the or each compressible and/or deformable sealing elements 16 positioned in the respective cable insertion region 17. This causes spring forces and the closing mechanism 23, namely the respective locking latch 25 of the respective locking segment 24, prevents a spring opening of the shell due to such forces.

Having described the general structure and operation of the closing mechanism 23, reference will now be made to particular details of the embodiment shown in the figures. As shown in FIGS. 3, 4, 7, and 8, the latch support 26 has an elongate body 40 extending in a longitudinal direction of the cable closure 10 and a plurality of support ribs 42 projecting from the elongate body 40 in a transverse direction. First and second sets 42a, 42b of the support ribs 42 are provided in the embodiment shown on opposite sides of the elongate body 40. The support ribs 42 in the first and second sets 42a, 42b both extend in a transverse direction from the elongate body 40 despite being on opposite sides thereof in that the support ribs 42 extend in planes perpendicular or substantially perpendicular to a longitudinal axis along which the elongate body 40 extends.

Figure 7:
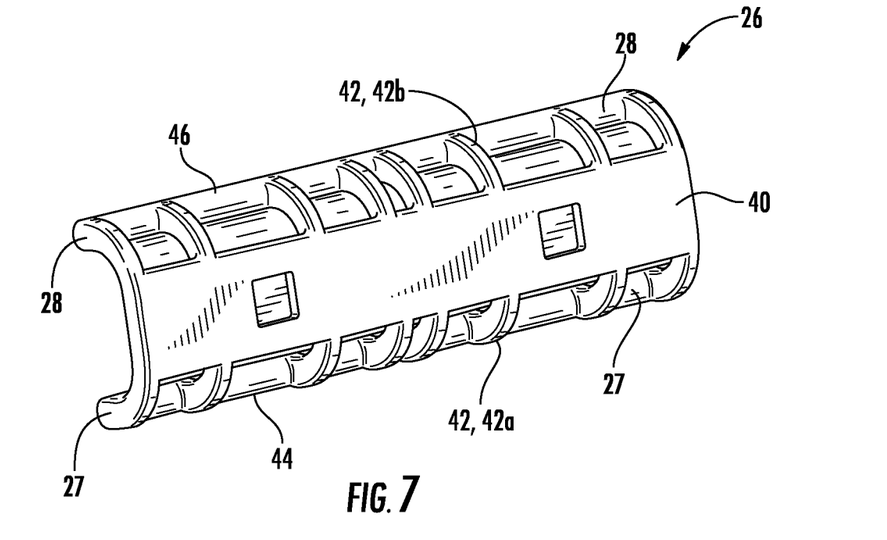
FIG. 7 is a first perspective view showing a second detail of the closing mechanism of the inline cable closure of FIGS. 1 to 4.
Figure 8:
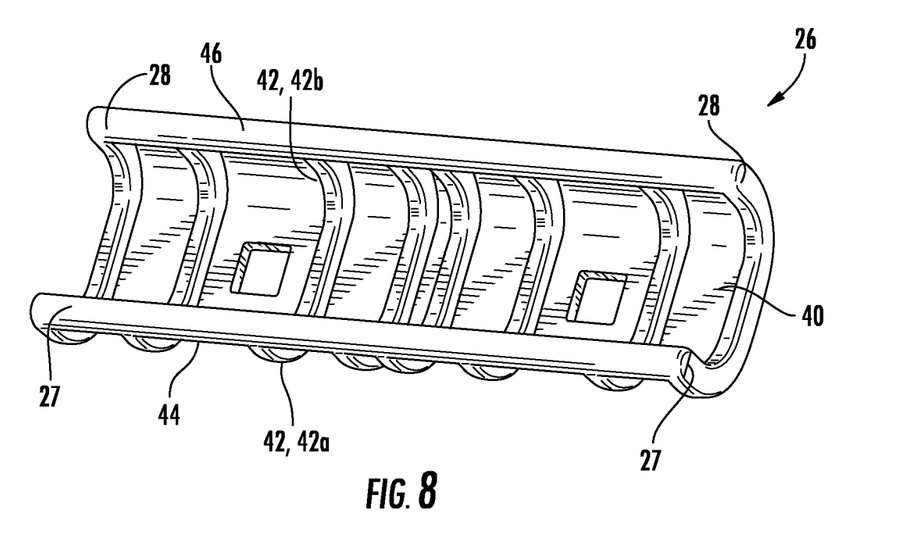
FIG. 8 is a second perspective view of the second detail shown in FIG. 7.

As best seen in FIGS. 7 and 8, the first set of support ribs 42a at least partially defines the first end section 27 of the latch support 26. The first end section 27 may also include interconnecting portions 44 extending between the support ribs 42a. Likewise, the second set of support ribs 42b at least partially defines the second end section 28 of the latch support 26. The second end section 28 may also include interconnecting portions 46 extending between the support ribs 42b. The latch support 26 may be a molded component such that the elongate body 40, support ribs 42, and interconnecting portions 44 and 46 form a unitary structure. Alternatively, multiple components may be assembled together to provide the latch 26 with the structural configuration described above.

The connection of the latch support 26 to the lower half-shell 11 will now be described with reference to FIGS. 1-4. As shown in FIGS. 1-4 and 9, the lower half-shell 11 includes a plurality of hook portions 50 configured to engage the first end section 27 of the latch support 26 to pivotally attach the latch support 26 to the lower half-shell 11. More specifically, the hook portions 50 of the lower half-shell 11 overhang and receive/engage the interconnecting portions 44 of the latch support 26. The hook portions 50 are spaced apart to accommodate the first set of support ribs 42a (i.e., the support ribs 42a are received in gaps/spaces between the hook portions 50). Jaw portions 52 on the lower half-shell 11 support the interconnecting portions 44 of the latch support 26 in the gaps/spaces between the hook portions 50.

Figure 9:
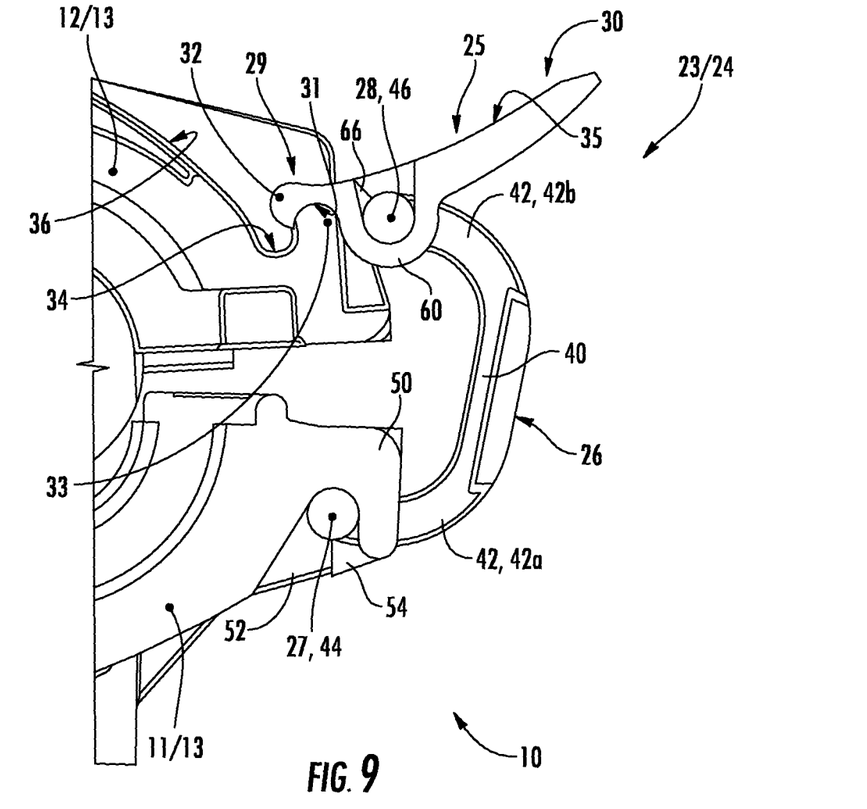
FIG. 9 is a schematic side view showing another detail of the closing mechanism of the inline cable closure of FIGS. 1 to 4.

Advantageously, the first end section 27 of the latch support 26 may be pivotably attached to the lower half-shell 11 with a snap-fit connection. This may be achieved, for example, by the jaw portions 52 including retention members 54 (FIG. 9; e.g., detents). The retention members 54 are biased by the first end section 27 of the latch support 26 when the latch support 26 is attached to the lower half-shell 11.

Figure 3:
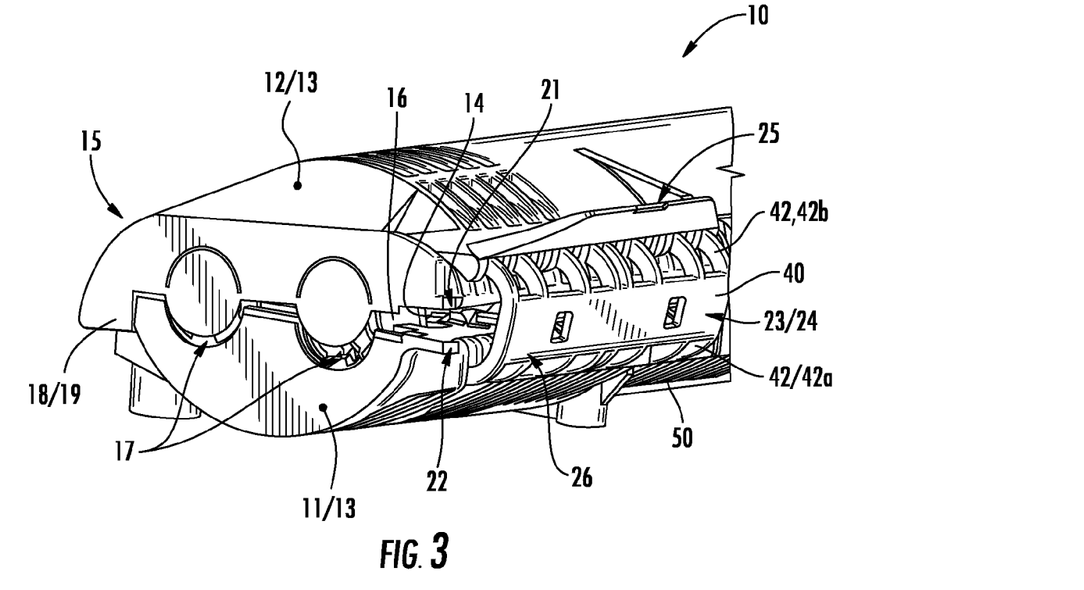
FIG. 3 is a perspective view of the exemplary embodiment of the cable closure in the partially closed status of the same.
Figure 5:
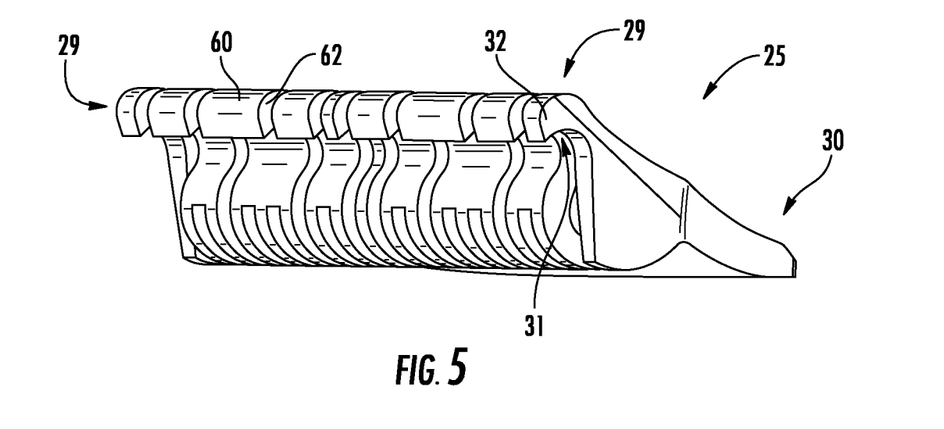
FIG. 5 is a first perspective view showing a first detail of the closing mechanism of the cable closure of FIGS. 1 to 4.
Figure 6:
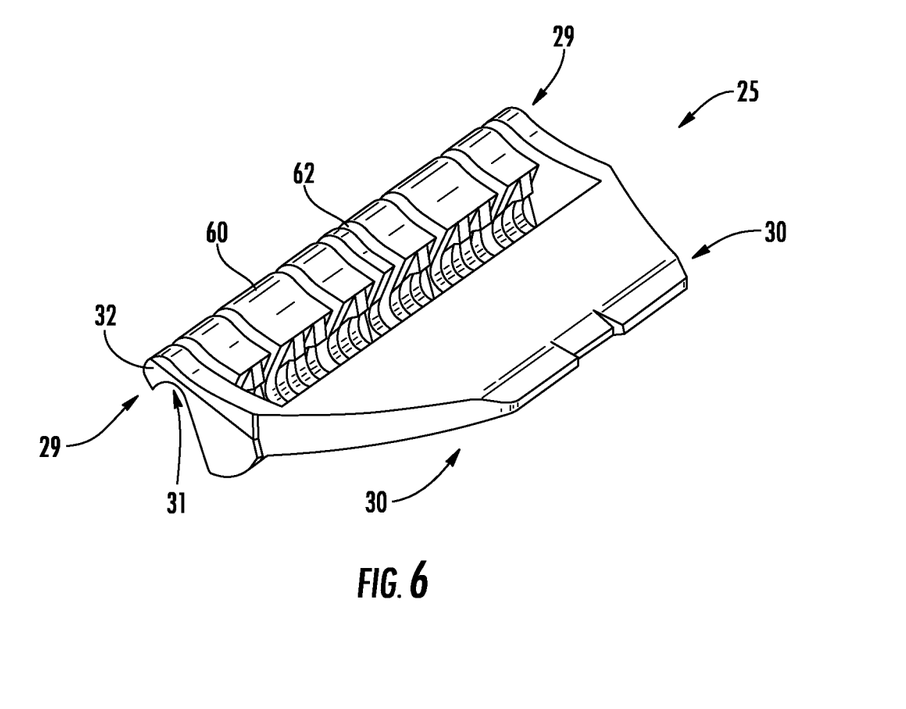
FIG. 6 is a second perspective view of the first detail shown in FIG. 5.

The connection of the latch support 26 to the locking latch 25 will now be described with reference to FIGS. 5 and 6, which illustrate the locking latch 25 in isolation, and FIGS. 3, 4, and 9, which illustrate the locking latch 25 and latch support 26 in a connected state. In the embodiment shown, the locking latch 25 includes a plurality of hook portions 60 configured to receive/engage the second end section 28 of the latch support 26 to pivotably attach the latch support 26 to the locking latch 25. More specifically, the hook portions 60 of the locking latch 25 are shaped to receive the interconnecting portions 46 (FIGS. 7 and 8) of the latch support 26. A plurality of slots 62 are defined between the hook portions 60 to accommodate/receive the support ribs 42b.

Similar to the connection of the first end second 27 of the latch support 26 to the lower half-shell 11, the second end section 28 of the latch support 26 may be pivotably attached to the locking latch 25 with a snap-fit connection. As best seen in FIG. 9, the hook portions 60 of the locking latch 25 define recesses in which a free end of the latch support 26 (e.g., defined by the interconnecting portions 46 and ends of support ribs 42b) is received. The snap-fit connection may be provided by retention members 66 on the locking latch 25 that extend into the recesses. Like the retention members 54, the retention members 66 are biased by the second end section 28 of the latch support 26 when the latch support 26 is attached to the locking latch 25.

Particular advantages may be obtained by positioning the retention members 60 between the first end section 29 of the locking latch 25 that acts together with the upper half-shell 12 and the second end section 28 of the latch support 26. This allows the retention members 60 to maintain a biasing/spring force against the second end section 28 of the latch support 26 throughout the range of motion of the locking latch 25. In other words, as the locking latch 25 is moved between the first lock-in position and second lock-in position, the retention members 60 maintain a spring force that biases the second end section 28 of the latch support 26 into the recesses defined by the hook portions 60 of the locking latch 25.

Another feature of the design of the embodiment shown in the figures relates to the number and/or spacing of the support ribs 42 of the latch support 26. As shown in FIG. 4, the upper half-shell 12 includes an outer surface 70 between the first and second sides 19, 21 of the upper half-shell 12 and one or more openings 72 extending from the outer surface 70 to the interior of the cable closure 10. The openings 72 at least partially define one or more gel compartments (i.e., gel may be inserted through the openings 72 into the interior of the cable closure 10). In these regions additional force may be required to close the cable closure 10 because the gel may provide an internal spring force that resists movement to a completely closed configuration. The locking latch 25 may be shaped with a taper so that the largest gripping area for a user is aligned in a transverse direction with the openings 72. Thus, forces applied by a user to the locking latch 25 may be greatest where needed the most.

Figure 4:
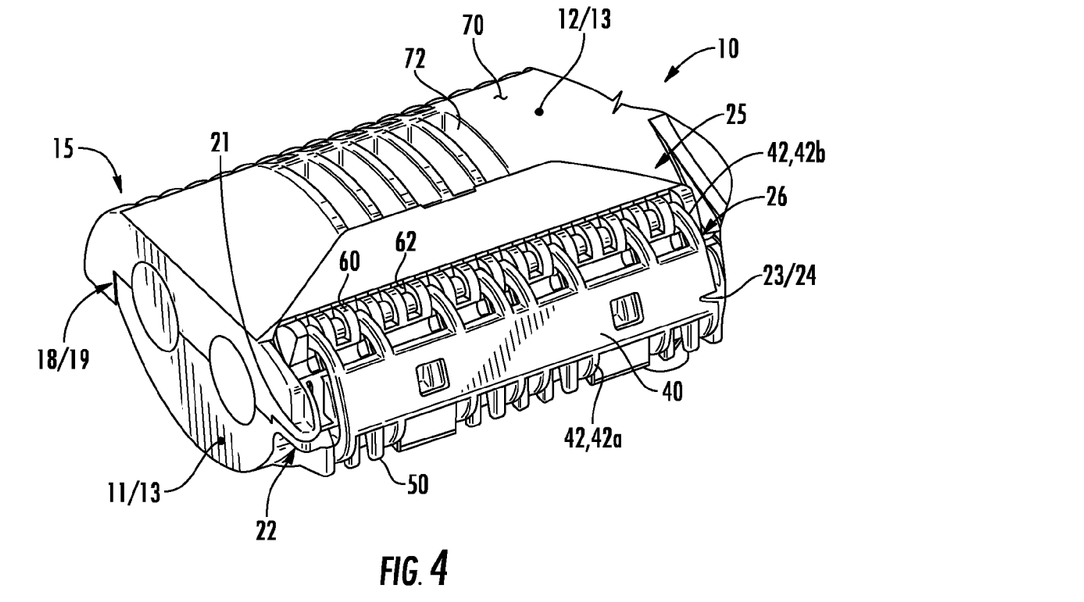
FIG. 4 is a perspective view of the exemplary embodiment of the cable closure in the completely closed status of the same.

Furthermore, FIG. 4 shows how the locking segment 26 extends in a longitudinal direction of the cable closure 10 with at least some of the support ribs 42 of the latch support 26 being aligned in a transverse direction with the openings 72 in the upper half-shell 12 (or with areas of the upper half-shell 12 between the openings 72). Advantageously, the number of support ribs 42 per unit length of the latch support 26 in the longitudinal direction is greater in this section the latch support 26 (i.e., the section that is aligned in a transverse direction with the openings 72 in the second half-shell 12) compared to other sections of the latch support 26. For example, the spacing between the support ribs 42 may be greatest where the latch support 26 is aligned in a transverse direction with the openings 72 in the upper half-shell 12.

Either or both of the locking latch 25 and latch support 26 may be molded from plastic material reinforced with glass fiber to provide additional structural integrity. In one specific embodiment, the locking latch 25 and/or latch support 26 are formed from a molded plastic material with at least 40% glass fiber. Such a construction helps ensure that the components withstand and transfer the forces imposed when opening and closing the cable closure 10 with the closing mechanism 23. The forces may be greater than closing mechanisms having a short longitudinal length. An advantage of long locking segments 24, however, is that the closing mechanism 23 may be easier to operate. The cable closure 10 may have a smaller overall number of locking latches to be actuated because of the increased length. The locking latch 25 may also have a large gripping area for a user, allowing him or her to actuate and/or grip the locking latch 25 with multiple or all fingers. This difference in length from conventional closing mechanisms may be appreciated by considering the ratio of the longitudinal length of the locking latch 25 (i.e., the distance the locking latch 25 extends in the longitudinal direction of the closure) compared to a transverse length of the locking latch 25 (i.e., the distance between free ends of the first and second end sections 29, 30). The longitudinal length of the locking latch 25 may be at least twice the transverse length of the locking latch 25. In some embodiments, the locking segment 24 may be designed so that the locking latch 25 has a length in a longitudinal direction of the cable closure 10 of at least 100 mm.

It will be apparent to those skilled in the art that various modifications and variations can be made without departing from the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A cable closure, comprising:
    a housing that delimits an interior of the cable closure and seals off the cable closure toward the outside, the housing being formed by a covering body that comprises shells and cable insertion regions provided on mutually opposite sides of the shells for inserting cables into the interior of the cable closure and/or for passing cables out of the interior of the cable closure;
    compressible and/or deformable sealing elements positioned at the mutually opposite sides of the covering body in the region of the cable insertion regions of the shells; and a closing mechanism configured to lock the shells together in a closed status of the cable closure, wherein the shells are hinged together at first sides so that the shells can be pivoted relative to each other when opening and closing the cable closure, and wherein the closing mechanism can be used to lock the shells to each other at second sides of the shells when the shells are in the closed position, the closing mechanism comprising at least one locking segment having a locking latch and a latch support;

wherein:
- the latch support is with a first end section pivotably attached to a first one of the shells and with a second end section pivotably attached to the locking latch;
- the locking latch has a first end section acting together with a second one of the shells when closing and opening the cable closure;
- the locking latch has a second end section serving as an actuating handle for closing and opening the cable closure;
- the second shell comprises an outer surface between the first and second sides of the second shell and one or more openings extending from the outer surface to the interior of the cable closure so that gel may be inserted through the one or more openings into the interior of the cable closure, the one or more openings at least partially defining one or more gel compartments;
- the latch support comprises an elongate body extending in a longitudinal direction and a plurality of support ribs projecting from the elongate body in a transverse direction; and
- the number of support ribs per unit length of the latch support in the longitudinal direction is greater in a section of the latch support that is aligned in a transverse direction with the one or more openings in the second shell of the covering body.

2. The cable closure according to claim 1, wherein a first set of the plurality of support ribs of the latch support at least partially define the first end section of the latch support, wherein the first shell of the covering body comprises a plurality of hook portions configured to receive the first end section of the latch support to pivotably attach the latch support to the first shell, and wherein the hook portions are spaced apart to accommodate the first set of support ribs.

3. The cable closure according to claim 2, wherein a second set of the plurality of support ribs at least partially define the second end section of the latch support, and wherein the locking latch comprises a plurality of slots in which the second set of support ribs are received.

4. The cable closure according to claim 3, wherein the locking latch comprises a plurality of hook portions configured to receive the second end section of the latch support to pivotably attach the latch support to the locking latch, the slots of the locking latch being defined between the hook portions.

5. The cable closure according to claim 4, wherein the hook portions of the locking latch define recesses in which a free end of the latch support is received, the locking latch further comprising retention members extending into the recesses for providing a snap-fit connection between the second end section of the latch support and the locking latch.

6. The cable closure according to claim 5, wherein the retention members of the locking latch are positioned between the first end section of the locking latch and the second end section of the latch support.

7. The cable closure according to claim 1, wherein the latch support comprises a plastic material reinforced with glass fiber.

8. The cable closure according to claim 1, wherein the distance between free ends of the first and second end sections of the locking latch defines a transverse length of the locking latch, wherein the locking latch extends in a longitudinal direction so as to have a longitudinal length, and wherein the longitudinal length of the locking latch is at least twice the transverse length of the locking latch.

9. The cable closure according to claim 1, wherein the locking segment of the closing mechanism is transferable between a first lock-in position fixing the relative position of the shells of the covering body and a second lock-in position fixing the relative position of the shells in a fully closed position, and wherein the locking latch of the locking segment pivots at least 90 degrees between the first and second lock-in positions.

10. The cable closure according to claim 1, wherein the latch support is with the second end section pivotably attached to a section of the locking latch having a shorter distance to the first end section of the locking latch than to the second end section of the same.

11. The cable closure according to claim 1, wherein the latch support is with the second end section pivotably attached to a section of the locking latch being positioned immediately adjacent to the first end section of the locking latch.

12. The cable closure according to claim 11, wherein the first end section of the locking latch which acts together with a second one of the shells when closing and opening the cable closure comprises a recess and a protrusion, wherein the protrusion provides a free end of the locking latch, and wherein the recess is positioned between the protrusion and the section of the of the locking latch to which the second end section of the latch support is pivotably attached.

13. The cable closure according to claim 12, wherein in a first lock-in position of the respective locking segment of the closing mechanism a protrusion of the second one of the shells projects into the recess of first end section of the locking latch thereby fixing the relative position of the shells in a partially closed position of the same wherein in a second lock-in position of the respective locking segment of the closing mechanism the protrusion of the first end section of the locking latch projects into a recess of the second one of the shells thereby fixing the relative position of the shells in a fully closed position of the same, and wherein the respective locking segment of the closing mechanism is transferable between the first lock-in position and the second lock-in position and vice versa between the second lock-in position and the first lock-in position by applying a force to the second end section of the locking latch.

14. The cable closure according to claim 13, wherein:
- for transferring the respective locking segment of the closing mechanism from the first lock-in position into the second lock-in position the locking latch is pivotable around an axis defined by the protrusion of the second one of the shells and the recess of first end section of the locking latch, and during this transfer from the first lock-in position to the second lock-in position the protrusion of the first end section of the locking latch becomes engaged with the recess of the second one of the shells while the protrusion of the second one of the shells becomes disengaged with the recess of first end section of the locking latch; and
- for transferring the respective locking segment of the closing mechanism from the second lock-in position into the first lock-in position the locking latch is pivotable around an axis defined by the protrusion of the first end section of the locking latch and the recess of the second one of the shells, and during this transfer from the second lock-in position to the first lock-in position the protrusion of the second one of the shells becomes engaged with the recess of first end section of the locking latch while the protrusion of the first end section of the locking latch becomes disengaged with the recess of the second one of the shells.

15. The cable closure according to 14, wherein a surface of the second end section of locking latch contacts a surface of the second one of the shells in the second lock-in position of the respective locking segment of the closing mechanism.

16. The cable closure according to claim 1, wherein the closing mechanism comprises at least two locking segments being positioned side by side and being individually lockable and unlockable.

17. A cable closure, comprising:
- a housing that delimits an interior of the cable closure and seals off the cable closure toward the outside, the housing being formed by a covering body that comprises shells and cable insertion regions provided on mutually opposite sides of the shells for inserting cables into the interior of the cable closure and/or for passing cables out of the interior of the cable closure;
- compressible and/or deformable sealing elements positioned at the mutually opposite sides of the covering body in the region of the cable insertion regions of the shells; and
- a closing mechanism configured to lock the shells together in a closed status of the cable closure, wherein the shells are hinged together at first sides so that the shells can be pivoted relative to each other when opening and closing the cable closure, and wherein the closing mechanism can be used to lock the shells to each other at second sides of the shells when the shells are in the closed position, the closing mechanism comprising at least one locking segment having a locking latch and a latch support;

wherein:
- the latch support is with a first end section pivotably attached to a first one of the shells and with a second end section pivotably attached to the locking latch;
- a first set of the plurality of support ribs of the latch support at least partially define the first end section of the latch support;
- a second set of the plurality of support ribs at least partially define the second end section of the latch support;
- the locking latch comprises a plurality of slots in which the second set of support ribs are received;
- the locking latch has a first end section acting together with a second one of the shells when closing and opening the cable closure;
- the locking latch has a second end section serving as an actuating handle for closing and opening the cable closure;
- the second shell comprises an outer surface between the first and second sides of the second shell and one or more openings extending from the outer surface to the interior of the cable closure so that gel may be inserted through the one or more openings into the interior of the cable closure, the one or more openings at least partially defining one or more gel compartments;
- the latch support comprises an elongate body extending in a longitudinal direction and a plurality of support ribs projecting from the elongate body in a transverse direction; and
- the number of support ribs per unit length of the latch support in the longitudinal direction is greater in a section of the latch support that is aligned in a transverse direction with the one or more openings in the second shell of the covering body.

* * * * *